United States Patent [19]

Ohta et al.

[11] Patent Number: 5,305,300
[45] Date of Patent: Apr. 19, 1994

[54] MAGNETO OPTICAL STORAGE DEVICE USING A MULTI-LAYER FILM OF PT/CO LAMINATED SECTIONS

[75] Inventors: Kenji Ohta; Akira Takahashi, both of Nara; Junsaku Nakajima, Yamatotakada; Yoshiteru Murakami, Nishinomiya, all of Japan

[73] Assignee: Sharp Kabushiki Kaisha, Osaka, Japan

[21] Appl. No.: 888,548

[22] Filed: May 22, 1992

[30] Foreign Application Priority Data

Feb. 13, 1991 [JP] Japan .................................. 3-20113
May 23, 1991 [JP] Japan ................................ 3-118857
May 23, 1991 [JP] Japan ................................ 3-118866

[51] Int. Cl.$^5$ .............................................. G11B 7/24
[52] U.S. Cl. .............................. 369/275.2; 369/283; 369/286; 369/288; 428/900; 428/694 R
[58] Field of Search ................... 369/275.2, 283, 286, 369/288, 100, 116; 428/900, 694; 430/845

[56] References Cited

U.S. PATENT DOCUMENTS

| | | | |
|---|---|---|---|
| 5,058,099 | 10/1991 | Murakami et al. | 369/288 |
| 5,109,375 | 4/1992 | Greidanus et al. | 369/283 |
| 5,143,798 | 9/1992 | Fujii | 369/288 |
| 5,187,703 | 2/1993 | Katayama et al. | 369/283 |
| 5,191,565 | 3/1993 | Inoue et al. | 369/283 |

FOREIGN PATENT DOCUMENTS

| | | |
|---|---|---|
| 0304873 | 3/1989 | European Pat. Off. |
| 0367685A3 | 5/1990 | European Pat. Off. |
| 0376375 | 7/1990 | European Pat. Off. |

OTHER PUBLICATIONS

Patent Abstracts of Japan, Publication No. JP4014641, Publication Date Jan. 1992.
Patent Abstracts of Japan, Publication No. JP3228238, Publication Date Oct. 1991.
Patent Abstracts of Japan, Publication No. JP4243037, Publication Date Aug. 1992.
Patent Abstracts of Japan, Publication No. JP4258829, Publication Date Sep. 1992.
W. B. Zeper, F. J. A. M. Greidanus, Evaporated Co/Pt Layered Structures for Magneto-Optical Recording, IEEE Transactions on Magnetics, vol. 25, No. 5, Sep. 1989.
S. Hashimoto, Y. Ochiai and K. Aso; Sputtering Gas Pressure Dependence of Magneto-Optical and Magnetic Properties in Ultrathin Co/Pt and Co/Pd Multilayers; The 13th Technical Reports of Japan Applied Magnetic Institute, Nov. 22, 1989; p. 55(22PC—3).
S. Hashimoto, Y. Ochiai and K. Aso; Effect of Metal Base Layer on Coercivity of Ultrathin Co/Pt and Co/Pd Multilayers; The 13th Technical Reports of Japan Applied Magnetics Institute, Nov. 22, 1989; p. 56.
Y. Ivasaki, Y. Ochiai, S. Hashimoto and K. Aso; Coercivity Enhancement of Co-Pt Multilayered Films by Metal Oxide Sublayers; The 13th Technical Reports of Japan Applied Magnetics Institute, Nov. 22, 1989; p. 129.

*Primary Examiner*—Constantine Hannaher
*Assistant Examiner*—Kim-Kwok Chu
*Attorney, Agent, or Firm*—David G. Conlin; Robert R. O'Connell

[57] ABSTRACT

A magneto-optical storage device having a configuration wherein a first AlN film, a Pt/co multi-layer film formed by alternately depositing Pt and Co, a second AlN film, and an Al reflective film are successively laminated on a substrate in this order. Assuming that respectively the thickness of the first AlN film is $\delta AlN$ (1); that of the second AlN film is $\delta AlN$ (2); that of the Pt single layer is $\delta Pt$; that of the Co single layer is $\delta Co$; and the total thickness of the Pt/Co multi-layer film is $\delta Pt/Co$, each thickness of those layers is set to range within: 50 nm $\leq \delta AlN$ (1)$\leq$200 nm; 120 nm$\leq \delta AlN$ (2)$\leq$140 nm; 0.6 nm$\leq \delta Pt \leq$1.0 nm; 0.3 nm$\leq \delta Co \leq$0.6 nm; and 15 nm$\leq \delta Pt/Co \leq$20 nm. In accordance with the above arrangement, it is possible to greatly widen the tolerances of the film thicknesses of the first and second dielectric layers for obtaining a predetermined reflective index as well as a maximum Kerr rotation angle. Consequently, without strictly controlling the film thicknesses of the first and second AlN films, a magneto-optical storage device with stable performance suitable for practical use can be produced easily.

9 Claims, 14 Drawing Sheets

LIGHT

MAGNETO OPTICAL STORAGE DEVICE USING A MULTI-LAYER FILM OF PT/CO LAMINATED SECTIONS

FIELD OF THE INVENTION

The present invention relates to a magneto-optical storage device on and from which information is recorded, erased and reproduced by a light beam such as a laser beam, and to the manufacturing method thereof.

BACKGROUND OF THE INVENTION

A magneto-optical storage device such as a magneto-optical disk has a configuration wherein, for example, the first dielectric layer, a recording layer, the second dielectric layer, a reflective layer and an overcoat layer are successively laminated on a substrate in this order.

The first and second dielectric layers are made up of, for example, AlN. The film thicknesses of the first and second dielectric layers are respectively arranged so that a light beam such as a laser beam, which has been incident thereon from the substrate side, is reflected with a predetermined reflective index, and so that the Kerr rotation angle of the reflected light beam is maximized. The magneto-optical storage device having the above arrangement is intended to prevent oxidation of the recording layer and to increase the Kerr rotation angle by utilizing the multiple reflection.

Amorphous rare-earth transition-metal alloys such as GdTbFe and TbFeCo are widely used for composing the recording layer. The recording layer is normally set to 15 nm–25 nm in thickness.

On the other hand, in recent years, magneto-optical storage devices provided with a Pt/Co multi-layer film have been recognized as a medium for enabling magneto-optical recording with high density. The Pt/co multi-layer film is constituted by Pt layers and Co layers that are alternately laminated one after the other. As is disclosed in Japanese Laid-Open Patent Application No. 2-263344, the Pt/Co multi-layer film exhibits the perpendicular magnetic anisotropy and provides a larger magnetic Kerr rotation angle with respect to light having a short wavelength than that made of a rare-earth transition-metal alloy.

Here, it is desirable for the Pt/Co multi-layer film to have a high coercive force in order to stably maintain recorded information. Some of those methods for manufacturing a Pt/Co multi-layer film with a high coercive force have been found in the abstracts of technical research reports of Japan Applied Magnetics Institute issued in 1989.

For example, according to a method described on page 55 in the abstracts, it is possible to obtain a Pt/Co multi-layer film with a high coercive force by increasing the pressure of Ar gas, which is used as a sputtering gas, during the manufacturing process of the Pt/Co multi-layer film through the sputtering method.

Moreover, according to a method described on page 56 in the abstracts, it is possible to obtain a Pt/Co multi-layer film with a high coercive force by forming it on a metal film having a fcc (face-centered cubic) structure, such as Pt and Pd, through the sputtering method.

In the case of adopting the aforementioned magneto-optical storage device using a rare-earth transition-metal alloy, since the Kerr rotation angle is greatly dependent on the film thicknesses of the first and second dielectric layers, even a small deviation of the film thickness from an appropriate setting value may decrease the Kerr rotation angle. This results in the problem that it is difficult to manufacture a magneto-optical storage device having stable performance.

Moreover, in the case of adopting the magneto-optical storage device wherein a Pt/Co multi-layer film is employed, the following problems have been encountered. As described in "IEEE TRANSACTIONS ON MAGNETICS", volume 25, number 5, page 3764, published in 1989, if the film thickness ratio between the Pt and Co layers of the Pt/Co multi-layer film (the film thickness of the Pt layer/that of Co layer) is increased, the Kerr rotation angle is conversely decreased, although a stable perpendicular magnetization is obtained. As a result, it is difficult to obtain a Pt/Co multi-layer film that has a stable perpendicular magnetization and also provides a large Kerr rotation angle to the incident light.

Furthermore, as to the manufacturing process of the Pt/Co multi-layer film, when a Pt/Co multi-layer film is produced under such a high pressure of Ar gas, a large number of pores are produced in the Pt/Co multi-layer film. In the case of forming a Pt/Co multi-layer film on a metal film having the fcc structure, if the metal film thickness is increased in order to increase the coercive force, the crystal grains of the Pt/Co multi-layer film are also grown in size. Therefore, when a magneto-optical storage device that has a Pt/Co multi-layer film manufactured through the above methods, is employed, noise might be caused during information reproduction due to the increased number of pores and the largeness of the crystal grains in the Pt/Co multi-layer film.

SUMMARY OF THE INVENTION

It is the first object of the present invention to provide a magneto-optical storage device wherein stable performance is achieved by widening the tolerances of the film thicknesses of the first and second dielectric layers so as to obtain a maximum Kerr rotation angle.

It is the second object of the present invention to increase both the stability of the perpendicular magnetization and the Kerr rotation angle of a Pt/Co multi-layer film.

It is the third object of the present invention to provide a Pt/Co multi-layer film wherein a high coercive force is achieved with a minimum of pores and small sized crystal grains.

In order to achieve the first objective, a magneto-optical storage device of the present invention has a configuration wherein a first AlN film, a Pt/Co multi-layer film formed by alternately laminating Pt and Co, a second AlN film, and an Al reflective film are successively laminated on a substrate in this order. Further, assuming that respectively the thickness of the first AlN film is $\delta AlN (1)$; that of the second AlN film is $\delta AlN (2)$; that of the Pt single layer is $\delta Pt$; that of the Co single layer is $\delta Co$; and the total thickness of the Pt/Co multi-layer film is $\delta Pt/Co$, each thickness of those layers is set to range within:

$$50 \text{ nm} \leq \delta AlN (1) \leq 200 \text{ nm}$$

$$120 \text{ nm} \leq \delta AlN (2) \leq 140 \text{ nm}$$

$$0.6 \text{ nm} \leq \delta pt \leq 1.0 \text{ nm}$$

$$0.3 \text{ mm} \leq \delta Co \leq 0.6 \text{ nm}$$

$$15 \text{ nm} \leq \delta Pt/Co \leq 20 \text{ nm}$$

In accordance with the above arrangement, it is possible to greatly widen the tolerances of the film thicknesses of the first and second dielectric layers for obtaining a predetermined reflective index as well as a maximum Kerr rotation angle. Consequently, different from the prior art, this arrangement obviates the necessity to strictly control the film thicknesses of the first and second AlN films in the manufacturing process of the magneto-optical storage device; therefore, a magneto-optical storage device with stable performance suitable for practical use can be produced easily.

In order to achieve the second objective, another magneto-optical storage device of the present invention is provided with a substrate and a Pt/Co multi-layer film formed by alternately laminating Pt layers and Co layers on the substrate one after the other, wherein the film thickness ratio of a pair of adjacent Pt and Co layers nearer to the substrate is set to become larger than that of another pair farther from the substrate.

In a Pt/Co multi-layer film having the above arrangement, since any portion nearer to the substrate has a stabler perpendicular magnetization than any other portion farther from the substrate, the magnetization of the Pt/Co multi-layer film becomes more stable in the perpendicular direction with respect to the Pt/Co multi-layer film even at a portion far away from the substrate. Therefore, a stabler perpendicular magnetization is attained even at a portion far away from the substrate.

Further, in the Pt/Co multi-layer film, any portion farther from the substrate exhibits a greater Kerr effect than any other portion nearer to the substrate. Thus, by projecting a light beam onto the Pt/Co multi-layer film from the side that exhibits the greater Kerr effect, a larger Kerr rotation angle can be obtained.

As described above, this arrangement makes it possible to obtain a magneto-optical storage device having a stabler perpendicular magnetization and a larger Kerr rotation angle.

In order to achieve the third objective of the present invention, the manufacturing method of the magneto-optical storage device of the present invention has the first step for forming an amorphous AlN film on the substrate by sputtering an Al target in a mixed gas of $N_2$ and Ar and the second step for forming a Pt/Co multi-layer film by alternately laminating Pt and Co layers on the AlN film by alternately sputtering Pt targets and Co targets in Ar gas. Here, the first step contains an operation for setting the $N_2$ gas flow rate so as to obtain a Pt/Co multi-layer film with a high coercive force.

With the above method, the setting of the $N_2$ gas flow rate is conducted so as to obtain a Pt/Co multi-layer film with a high coercive force during the manufacturing process of the AlN film; therefore, a magneto-optical storage device having a Pt/Co multi-layer film with a high coercive force can be produced without using a high Ar gas pressure under which the Pt/Co multi-layer film is formed. Consequently, since the necessity of increasing the Ar gas pressure during the manufacturing process of the Pt/Co multi-layer film is eliminated, a Pt/Co multi-layer film with a minimum of pores can be obtained. Furthermore, since the Pt/Co multi-layer film is formed on an amorphous AlN film, a Pt/Co multi-layer film whose crystal grain size is small can be obtained.

Therefore, by providing therein with such a Pt/Co multi-layer film, a magneto-optical storage device wherein noise reduction is achieved during information reproduction can be obtained.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 9, the following description will discuss one preferred embodiment of the present invention.

Figure 8:
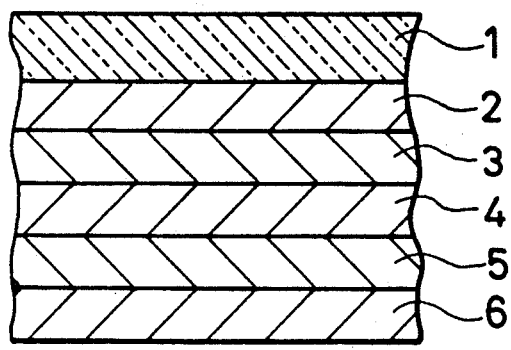
FIG. 8 is a schematic longitudinal cross-sectional view illustrating the structure of a magneto-optical storage device of the present invention.

As shown in FIG. 8, a magneto-optical storage device of the present embodiment has a configuration wherein the first AlN film 2, a Pt/Co multi-layer film 3, the second AlN film 4, an Al reflective film 5 and an overcoat film 6 are successively laminated on a substrate 1 in this order. The substrate 1 is made up of glass or resin such as polycarbonate so that it transmits a light beam such as a laser beam. The first AlN film 2 and the second AlN film 4 are respectively provided as dielectric layers.

In this magneto-optical storage device, the Pt/Co multi-layer film 3, which functions as a recording layer, is sandwiched between the first and second AlN films 2, 4 as dielectric layers; this structure makes it possible to prevent oxidation of the recording layer and to increase the Kerr rotation angle (hereinafter, denoted as $\theta_K$) by utilizing the multiple reflection.

Figure 9:
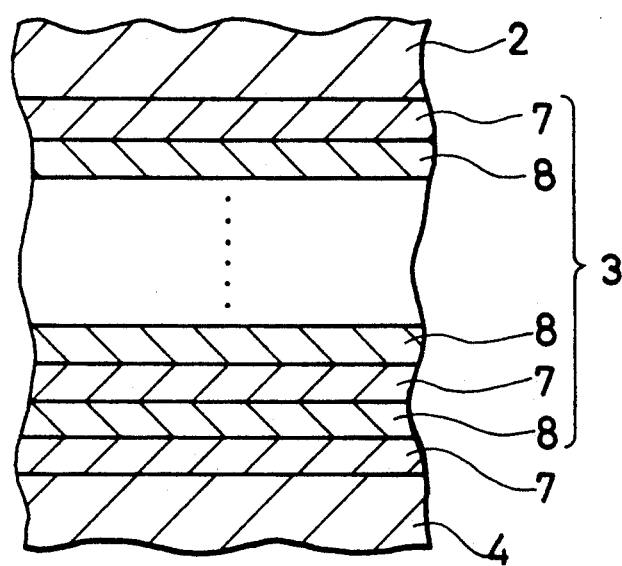
FIG. 9 is a schematic longitudinal cross-sectional view illustrating the structure of a Pt/Co multi-layer film of the FIG. 8 magneto-optical storage device.

As shown in FIG. 9, the Pt/Co multi-layer film 3 has a configuration wherein Pt layers 7 and Co layers 8 are alternately laminated. In order to make the Pt/Co multi-layer film 3 function as a perpendicularly magnetized film having an easy axis of magnetization that is perpendicular to the surface of the substrate 1, the thicknesses of the Pt layers 7 and the Co layers 8 as well as the total film thickness of the Pt/Co multi-layer film 3 are respectively set to predetermined values.

In the present embodiment, the following method was adopted to set the thicknesses of the above-mentioned Pt layers 7 and Co layers 8.

Figure 3:
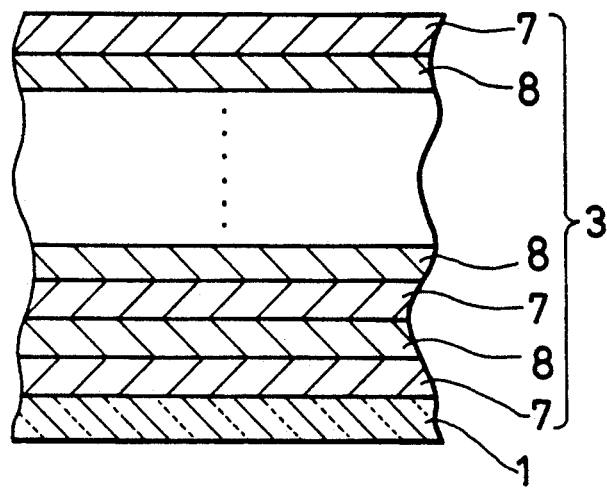
FIG. 3 is a schematic longitudinal cross-sectional view illustrating the structure of a sample that is employed for setting the film thicknesses of a Pt layer and a Co layer.

As shown in FIG. 3, three samples of Pt/Co multi-layer film 3 were first formed by alternately laminating the Pt layers 7 and the Co layers 8 on the substrate 1 made up of glass; each of the thicknesses of these samples was set as indicated in Table 1. Then, Kerr loops were measured, and their shapes were evaluated. Here, in Table 1, $\delta Pt$, $\delta Co$ and $\delta Pt/Co$ respectively represent the thickness of the Pt layer 7, that of the Co layer 8 and the total film thickness of the Pt/Co multi-layer film 3.

TABLE 1

|  | $\delta Pt$ (nm) | $\delta Co$ (nm) | $\delta Pt/Co$ (nm) |
|---|---|---|---|
| Sample A | 0.8 | 0.3 | 16.2 |
| Sample B | 0.6 | 0.5 | 16.0 |
| Sample C | 0.5 | 0.6 | 15.9 |

Figure 4:
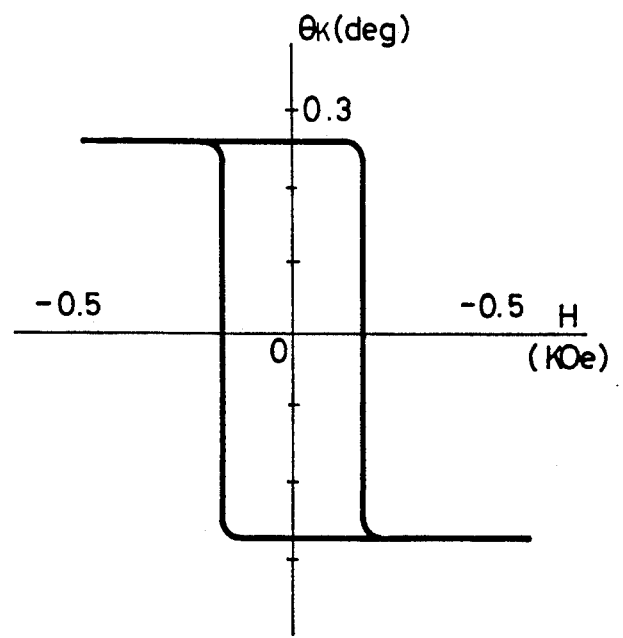
FIG. 4 illustrates one example of Kerr loop having a substantially perfect rectangular shape, which is obtained by the use of the sample A.
Figure 5:
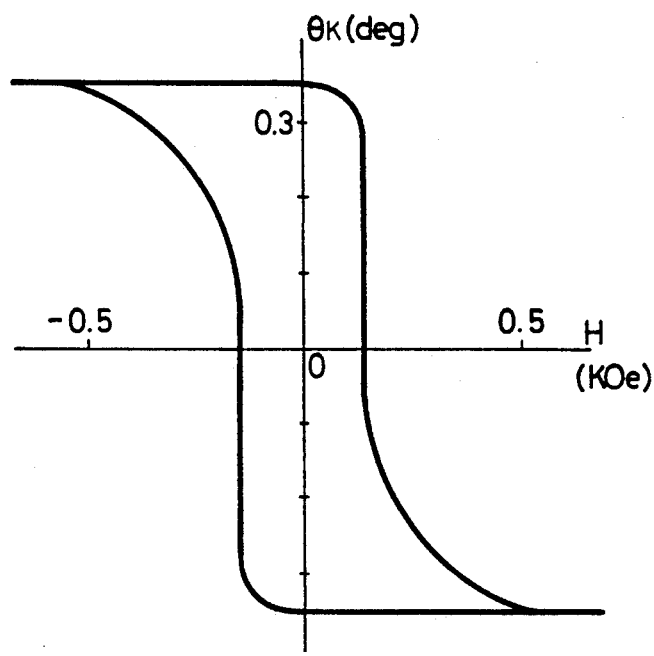
FIG. 5 illustrates one example of Kerr loop having a rather imperfect rectangular shape, which is obtained by the use of a sample B.
Figure 6:
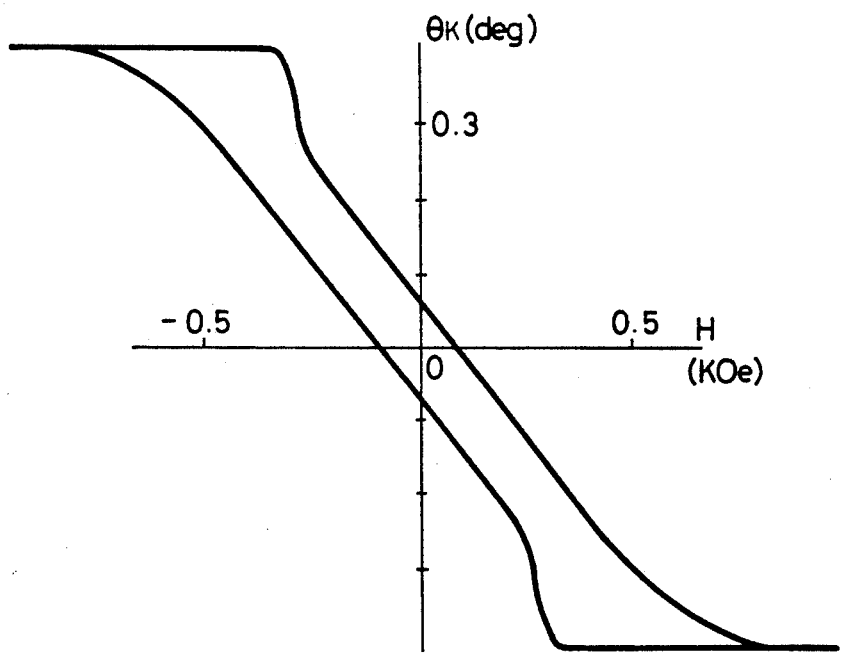
FIG. 6 illustrates one example of Kerr loop which is obtained by the use of a sample C without the function of a perpendicularly magnetized film.

FIGS. 4 through 6 show the shapes of those Kerr loops obtained through the above procedures. Here, in each drawing, the vertical axis represents $\theta_K$ while the horizontal axis represents the magnetic field H to be applied. The Kerr loops of respective FIGS. 4 through 6 were obtained from the samples A through C in Table 1.

The shapes of the Kerr loops of FIGS. 4 through 6 show that the samples A and B will function as perpendicularly magnetized films. Especially, the Kerr loop of the sample A, shown in FIG. 4, has a substantially perfect rectangular shape; this indicates that the sample A is best suited for use as a recording layer of the magneto-optical storage device. Moreover, the sample B, which has a rather imperfect rectangular shape in its Kerr loop as shown in FIG. 5, is not regarded as the best-suited material; however, it may still be used as a recording layer. On the other hand, the sample C, which no longer has a rectangular shape in its Kerr loop as shown in FIG. 6, does not function as a perpendicularly magnetized film.

Figure 7:
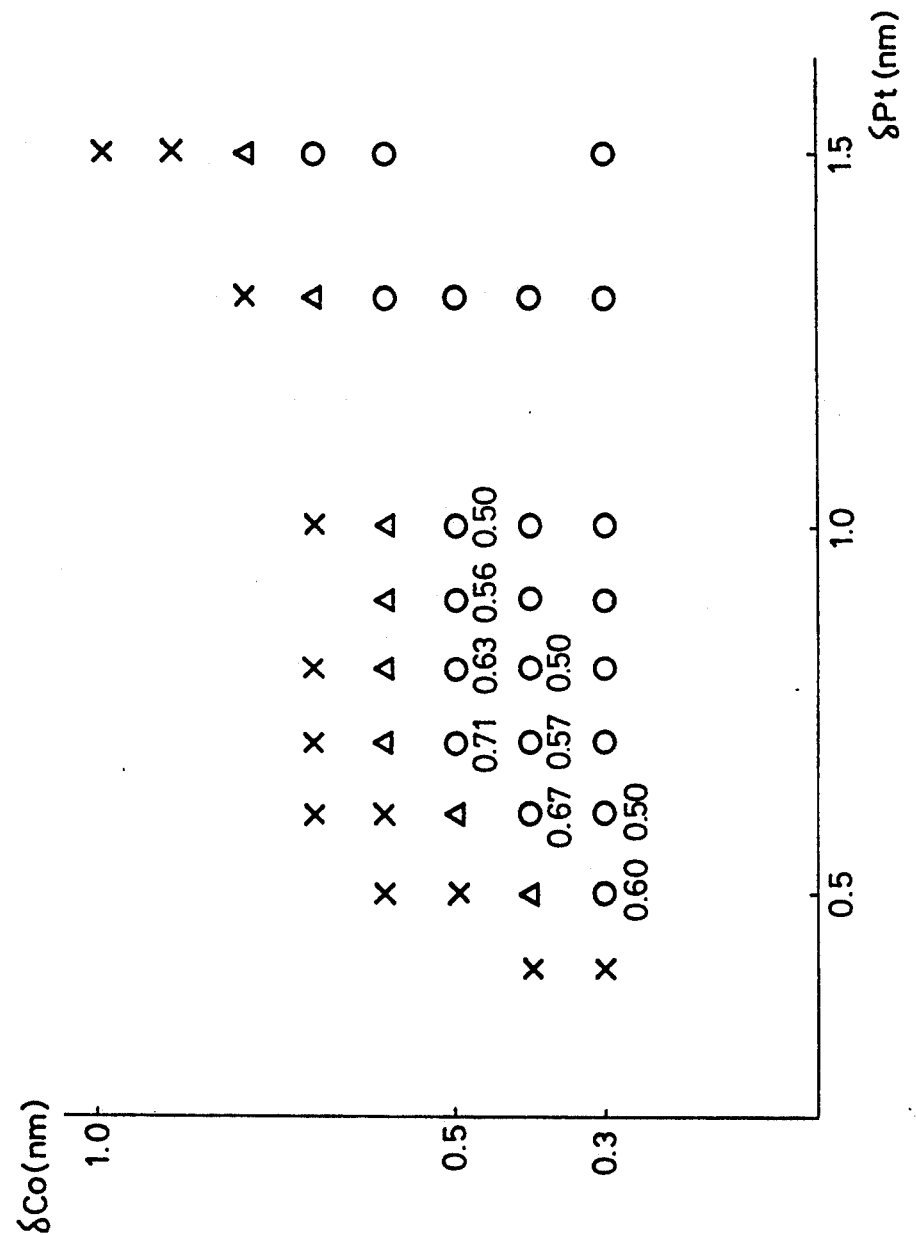
FIG. 7 is a graph illustrating the relationship between the combination of the thicknesses of the Pt and Co layers and the shape of the Kerr loop.

Here, in order to find out combinations of $\delta Pt$ and $\delta Co$ by which a substantially perfect rectangular-shaped Kerr loop is obtained, various samples were formed within a range of 15 nm $\leq \delta Pt/Co \leq$ 20 nm, and each of the thicknesses of these samples was measured and then Kerr loops were measured for evaluation. Further, ratios of $\delta Co$ and $\delta Pt$, that is $(\delta Co)/(\delta Pt)$, were measured. Here, the greater the ratio becomes, the greater $\theta_K$ becomes because the content of Co, which is a magnetic material, is increased; therefore, the materials having a greater ratio are better suited for the Pt/Co multi-layer film 3 as a recording layer of the magneto-optical storage device. FIG. 7 shows the results.

In FIG. 7, rounded indications represent samples having substantially perfect rectangular-shaped Kerr loops, such as the sample A; triangular indications represent those having rather imperfect rectangular-shaped Kerr loops, such as the sample B; and cross indications represent those not functioning as a perpendicularly magnetized film, such as the sample C. Further, the subscript figures of the rounded indications represent ratios of $\delta Co$ and $\delta Pt$; those figures are given if they are not less than 0.5.

According to the results given from the above procedures, in order to obtain a Pt/Co multi-layer film 3 that has a substantially perfect rectangular-shaped Kerr loop as well as has a great $\delta K$, $\delta Pt$ and $\delta Co$ are preferably arranged to lie within the respective ranges of (A); and more preferable, within the respective ranges of (B).

(A) 0.6 nm $\leq \delta Pt \leq$ 1.0 nm, 0.3 nm $\leq \delta Co \leq$ 0.6 nm (B) 0.7 nm $\leq \delta Pt \leq$ 0.8 nm, 0.4 nm $\leq \delta Co \leq$ 0.5 nm Next, based on the above results, a magneto-optical storage device having the arrangement shown in FIG. 8 was manufactured in accordance with the following values. In this magneto-optical storage device, the Pt layer 7 and the Co layer 8 of the Pt/Co multi-layer film 3 were respectively set to 0.6 nm and 0.3 nm in thickness. The Pt/Co multi-layer film was constituted by sixteen Pt layers 7 and fifteen Co layers 8, and had a total film thickness of 15.1 nm.

Then, the reflective index and $\theta_K$ were measured with respect to a laser beam having a wavelength of 780 nm by the use of the above-mentioned magneto-optical storage device, and combinations of the thicknesses of the first AlN film 2 and the second AlN film 4 were determined so as to get a predetermined reflective index and a maximum value of $\theta_K$. Here, the Al reflective film 5 was set to 50 nm in thickness.

Figure 1:
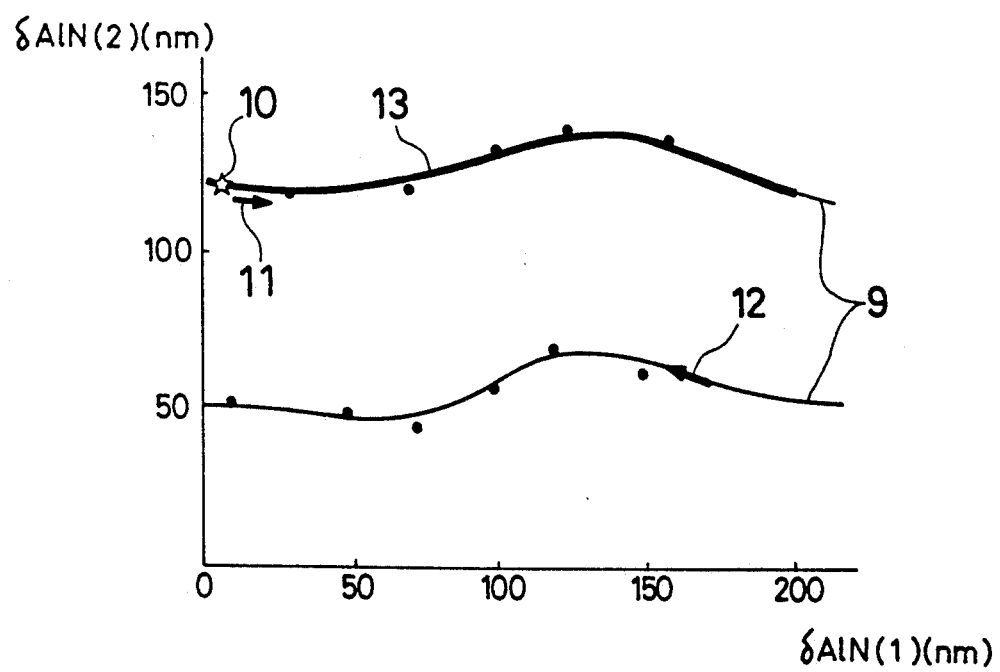
FIG. 1 is a graph illustrating a combination of the thicknesses of the first and second AlN films to attain the reflective index of 15% in a magneto-optical storage device in accordance with a first embodiment of the present invention.

First, in the above-mentioned magneto-optical storage device, assuming that the predetermined reflective index is set to 15%, the conditions to achieve this reflective index are shown in FIG. 1. In FIG. 1, the vertical axis represents $\delta$AlN (2), that is, the film thickness of the second AlN film 4 while the horizontal axis represents $\delta$AlN (1), that is, the film thickness of the first AlN film 2.

In FIG. 1, the combinations of $\delta$AlN (1) and $\delta$AlN (2), lying on curves 9, are to give the reflective index of 15%, and therefore, the combination of $\delta$AlN (1) and $\delta$AlN (2), which lies on the curves 9 and further exhibits a maximum value of $\theta_K$, is regarded as the best-suited among those combinations.

Figure 2:
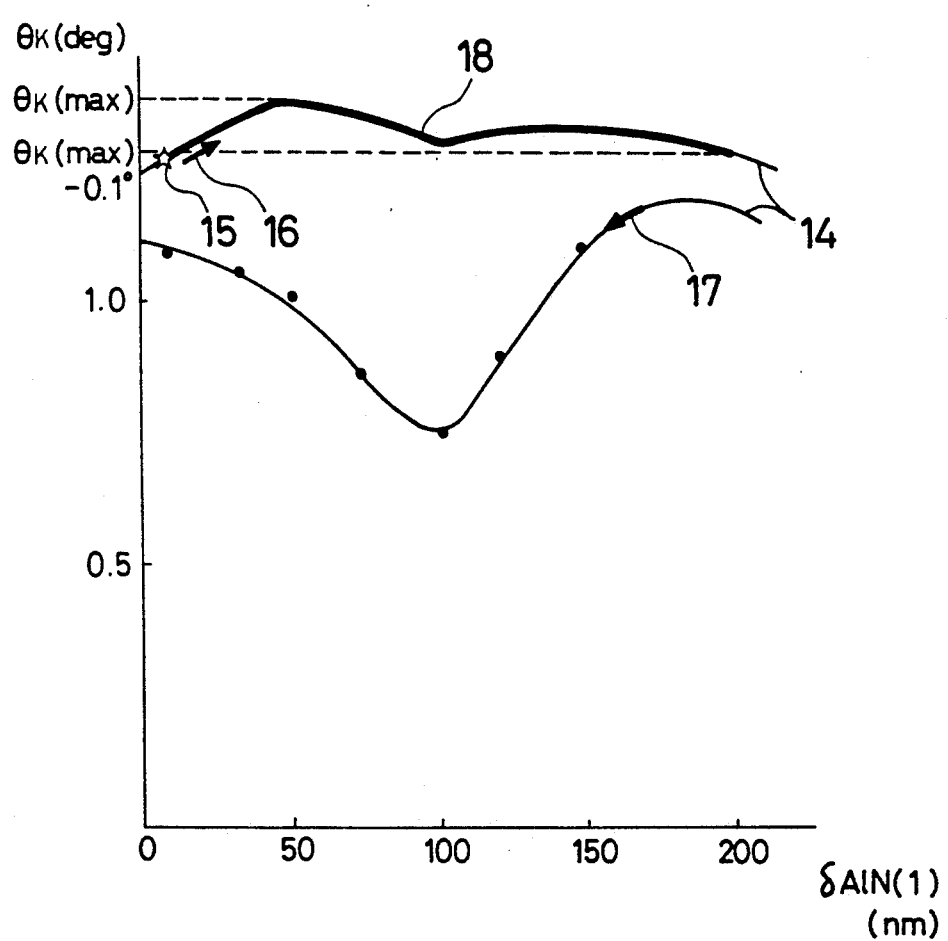
FIG. 2 is a graph illustrating the relationship between the Kerr rotation angle and the film thickness of the first AlN film under the conditions of FIG. 1.

Next, FIG. 2 illustrates $\theta_K$ corresponding to each point plotted on the curves 9. In FIG. 2, the vertical axis represents $\theta_K$ while the horizontal axis represents $\delta$AlN (1).

Here, values of $\theta_K$ have been successively found along the upper curve 9 in the direction of an arrow 11 from an asterisk 10 of FIG. 1 as a starting point; this results in a upper curve 14 wherein, as shown in FIG. 2, $\theta_K$ varies with $\delta$AlN (1) in the direction of an arrow 16 from an asterisk 15 as a starting point. Moreover, as to $\theta_K$ that corresponds to the combinations along the lower curve 9 of FIG. 1 in the direction of an arrow 12, it is given by variations along a lower curve 14 in FIG. 2 in the direction of an arrow 17.

In FIG. 2, assuming that an area between the maximum value $\theta_K$ (max) of $\theta_K$ and a value less than the maximum value by 0.1° ($\theta_K$(max)$-0.1°$) gives the range where $\theta_K$ is maximum, this range corresponds to $\delta$AlN (1) that lies within a range indicated by a heavy line 18 on the curve 14. Moreover, the heavy line 18 corresponds to a heavy line 13 drawn on the curve 9 in FIG. 1; therefore, $\delta$AlN (1) and $\delta$AlN (2) residing in the range indicated by the heavy line 13 provide the best-suited combinations to make $\theta_K$ maximum.

Consequently, in order to obtain the first AlN film 2 and the second AlN film 4, a combination of which makes $\theta$hd K maximum while achieving a reflective index of 15%, it is preferable that $\delta$AlN (1) and $\delta$AlN (2) are arranged to lie within the respective ranges: 0 nm$\leq\delta$AlN (1)$\leq$200 nm and 120 nm$\leq\delta$AlN (2)$\leq$140 nm.

Here, in the case of adapting the first AlN film 2 and the second AlN film 4 as protective films, $\delta$AlN (1) can not be set to 0 nm. Therefore, a film thickness of not less than 10 nm is necessary to form an AlN film having stable performance; thus, $\delta$AlN (1) is preferably set to be within a range: 10 mn$\leq\delta$AlN (1)$\leq$200 nm.

Figure 10:
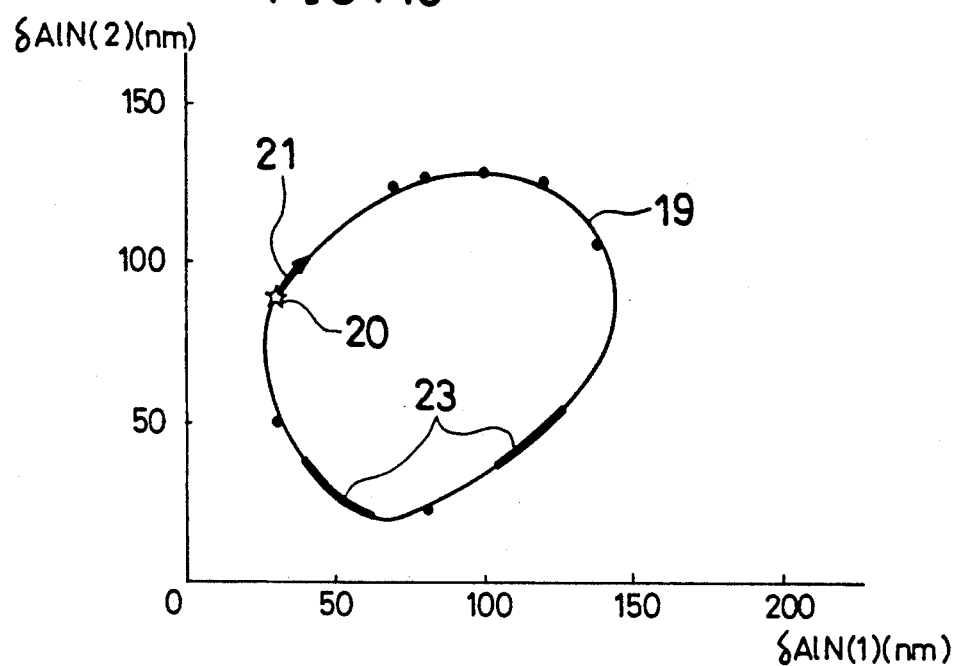
FIG. 10 is a graph, which shows the first comparative example to the first embodiment of the present invention, illustrating a combination of the thicknesses of the first and second AlN films to attain the reflective index of 15% in a magneto-optical storage device wherein GdTbFe is used as a recording layer.
Figure 11:
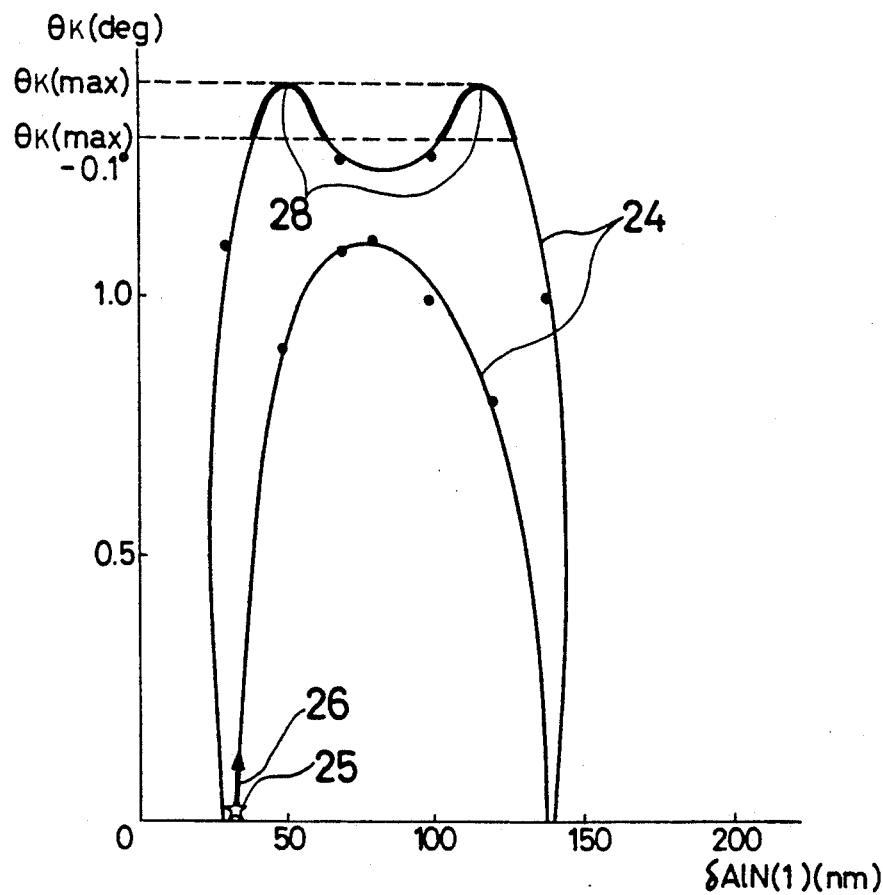
FIG. 11 is a graph illustrating the relationship between the Kerr rotation angle and the film thickness of the first AlN film under the conditions of FIG. 10.

Referring to FIGS. 10 and 11, as the first example for comparison, the following description will discuss a case wherein GdTdFe as an amorphous rare-earth transition-metal alloy (hereinafter, referred to as RE-TM) is employed to form a recording layer instead of the Pt/Co multi-layer film 3 in a magneto-optical storage device having the arrangement of FIG. 8.

First, in the above-mentioned magneto-optical storage device, the conditions to achieve the reflective index of 15% are shown in FIG. 10. In FIG. 10, the vertical axis represents $\delta$AlN (2), that is, the film thickness of the second AlN film 4 while the horizontal axis represents $\delta$AlN (1), that is, the film thickness of the first AlN film 2.

In FIG. 10, the combinations of $\delta$AlN (1) and $\delta$AlN (2), lying on a curve 19, are to give the reflective index of 15%, and therefore, the combination of $\delta$AlN (1) and $\delta$AlN (2), which lies on the curve 19 and further exhibits a maximum value of $\theta_K$, is regarded as the best-suited among those combinations.

Next, FIG. 11 illustrates $\theta_K$ corresponding to each point plotted on the curve 19. In FIG. 11, the vertical axis represents $\theta_K$ while the horizontal axis represents $\delta$AlN (1).

Here, values of $\theta_K$ have been successively found along the curve 19 in the direction of an arrow 21 from an asterisk 20 in FIG. 10 as a starting point; this results in a upper curve 24 wherein, as shown in FIG. 11, $\theta_K$ varies with $\delta$AlN (1) in the direction of an arrow 26 from an asterisk 25 as a starting point.

In FIG. 11, assuming that an area between the maximum value $\theta_K$ (max) of $\theta_K$ and a value less than the maximum value by 0.10° ($\theta_K$ (max)$-0.1°$) gives the range where $\theta_K$ is maximum, this range corresponds to $\delta$AlN (1) that lies within a range indicated by a heavy line 28 on the curve 24. Moreover, the heavy line 28 corresponds to a heavy line 23 drawn on the curve 19 in FIG. 10; therefore, $\delta$AlN (1) and $\delta$AlN (2) residing in the range indicated by the heavy line 23 provide the best-suited combinations to make $\theta_K$ maximum.

When comparison is made between the range indicated by the heavy line 23 in the first example for comparison and the range indicated by the heavy line 13 in FIG. 1 of the aforementioned embodiment, it is found that the aforementioned embodiment makes it possible to greatly widen the tolerances of the film thicknesses of the first and second AlN films 2 and 4 for obtaining the predetermined reflective index and making $\theta_K$ maximum.

Figure 12:
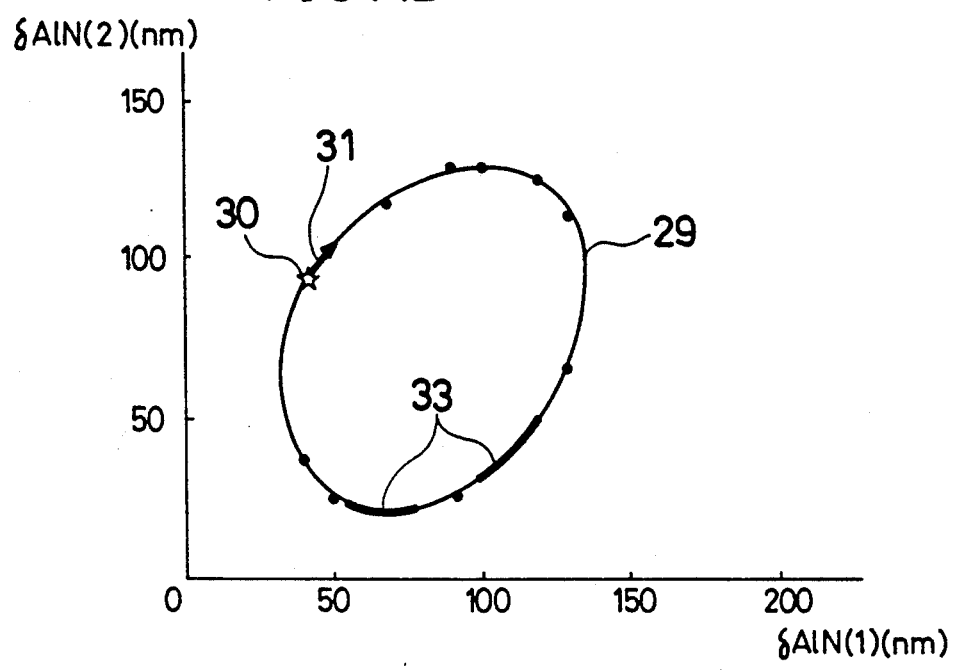
FIG. 12 is a graph, which shows the second comparative example to the first embodiment of the present invention, illustrating a combination of the thicknesses of the first and second AlN films to attain the reflective index of 15% in a magneto-optical storage device wherein TbFeCo is used as a recording layer.
Figure 13:
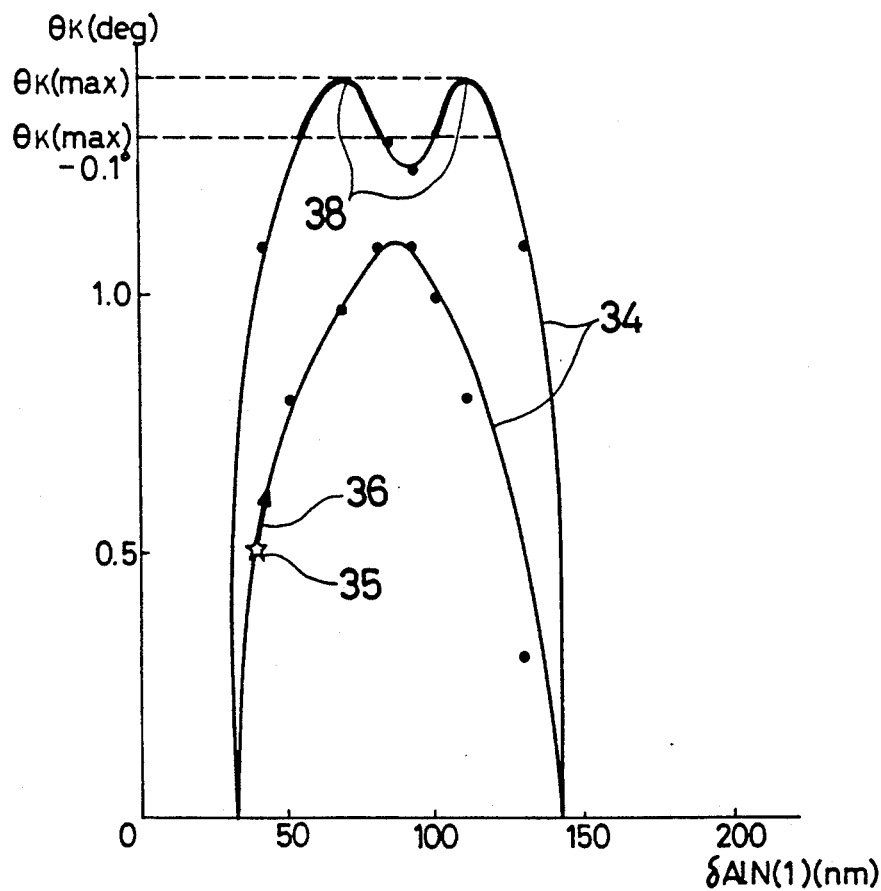
FIG. 13 is a graph illustrating the relationship between the Kerr rotation angle and the film thickness of the first AlN film under the conditions of FIG. 12.

Referring to FIGS. 12 and 13, as the second example for comparison, the following description will discuss a case wherein TbFeCo as RE-TM is employed to form a recording layer instead of the Pt/Co multi-layer film 3 in a magneto-optical storage device having the arrangement of FIG. 8.

First, in the above-mentioned magneto-optical storage device, the conditions to achieve the reflective index of 15% are shown in FIG. 12. In FIG. 12, the vertical axis represents $\delta$AlN (2) while the horizontal axis represents $\delta$AlN (1).

In FIG. 12, the combinations of $\delta$AlN (1) and $\delta$AlN (2), lying on a curve 29, are to give the reflective index of 15%, and therefore, the combination of $\delta$AlN (1) and $\delta$AlN (2) that lies on the curve 29 and further exhibits a maximum value of $\theta_K$ is regarded as the best-suited among those combinations.

Next, FIG. 13 illustrates $\theta_K$ corresponding to each point plotted on the curve 29. In FIG. 13, the vertical axis represents $\theta_K$ while the horizontal axis represents $\delta$AlN (1).

Here, values of $\theta_K$ have been successively found along the curve 29 in the direction of an arrow 31 from an asterisk 30 in FIG. 12 as a starting point; this results in a curve 34 wherein, as shown in FIG. 13, $\theta_K$ varies with $\delta$AlN (1) in the direction of an arrow 36 from an asterisk 35 as a starting point.

In FIG. 13, assuming that an area between the maximum value $\theta_K$ (max) of $\theta_K$ and a value less than the maximum value by 0.10 ($\theta_K$ (max)$-0.10$) gives the range where $\theta_K$ is maximum, this range corresponds to $\delta$AlN (1) that lies within a range indicated by a heavy line 38 on the curve 34.

Moreover, the heavy line 38 corresponds to a heavy line 33 on the curve 29 in FIG. 12; therefore, δAlN (1) and δAlN (2) residing in the range indicated by the heavy line 33 provide the best-suited combinations to make $\theta_K$ maximum.

When comparison is made between the range indicated by the heavy line 33 in the second example for comparison and the range indicated by the heavy line 13 in FIG. 1 of the aforementioned embodiment, it is found that the aforementioned embodiment makes it possible to greatly widen the tolerances of the film thicknesses of the first and second AlN films 2 and 4 for obtaining the predetermined reflective index and making $\theta_K$ maximum.

As described above, in comparison with those cases using RE-TM such as GdTbFe and TbFeCo the application of a Pt/Co multi-layer film 3 as a recording layer of the magneto-optical storage device makes it possible to greatly widen the tolerances of the film thicknesses of the first and second AlN films 2 and 4 for obtaining a predetermined reflective index and making $\theta_K$ maximum. Consequently, a magneto-optical storage device with stable performance suitable for practical use can be easily produced without strictly controlling the film thicknesses of the first and second AlN films 2 and 4.

Figure 14:
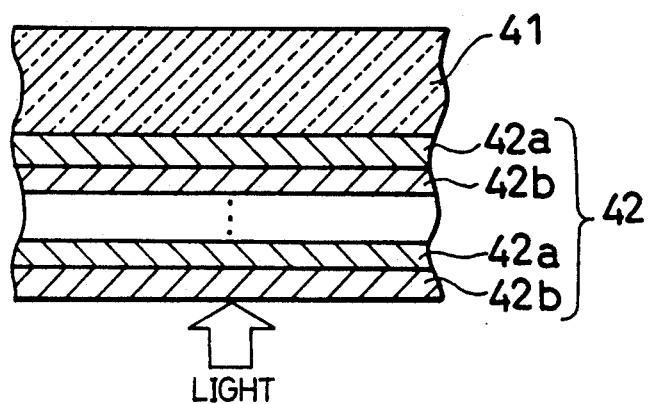
FIG. 14 is a schematic side view of a magneto-optical storage device in accordance with the second embodiment of the present invention.

Referring to FIG. 14, the following description will discuss the second embodiment of the present invention.

As illustrated in FIG. 14, a magneto-optical storage device of the present embodiment is constituted by a substrate 41, made of glass or a resin such as polycarbonate, and a Pt/Co multi-layer film 42 formed on the substrate 41. A light beam is directed onto the Pt/Co multi-layer film 42 from the side farther from the substrate 41. The Pt/Co multi-layer film 42 has a configuration wherein Pt layers 42a and Co layers 42b are alternately laminated one after the other.

In the Pt/Co multi-layer film 42 of the magneto-optical storage device, the film thickness ratio of any adjacent pair of the Pt layer 42a and Co layer 42b (film thickness of the Pt layer 42a/that of the Co layer 42b) is not constant, but is set to become smaller in the departing order from the pair nearest to the substrate 41.

More specifically, for example, the film thickness of the Pt layer 42a that is located nearest to the substrate 41 is set to 15 Å, and the film thicknesses of the other Pt layers 42a are set to successively become smaller in the departing order from the substrate 41, and then the film thickness of the Pt layer 42a that is located farthest from the substrate 41 is set to 6 Å. On the other hand, the film thickness of the Co layers 42b is constant, and set to 5 Å. Further, the total number of the Pt layers 42a and Co layers 42b is determined to be 20–100.

With this setting of the film thickness ratios, the Pt/Co multi-layer film 42 exhibits a stabler perpendicular magnetization at any portion nearer to the substrate 41 (hereinafter called the nearer layers) than at any other portion farther from the substrate 41 (hereinafter called the farther layers), while it exhibits a greater Kerr effect at the farther layers than at the nearer layers.

In the above configuration, a larger Kerr rotation angle can be obtained by projecting a light beam thereonto from the Pt/Co multi-layer film 42 side that exhibits the greater Kerr effect. Moreover, since the Pt/co multi-layer film 42 exhibits a stabler perpendicular magnetization at the nearer layers than at the farther layers, the electron spin of Co layer 42b included in the farther layers becomes more stable when its direction becomes coincident with the direction of the electron spin of Co layer 42b included in the nearer layers, that is, the vertical direction to the Pt/Co multi-layer film 42. Therefore, even at a portion farther from the substrate 41, a stabler perpendicular magnetization is attained. Thus, this configuration makes it possible to obtain a magneto-optical storage device having a stabler perpendicular magnetization and a larger Kerr rotation angle with respect to a light beam with a short wavelength.

Figure 15:
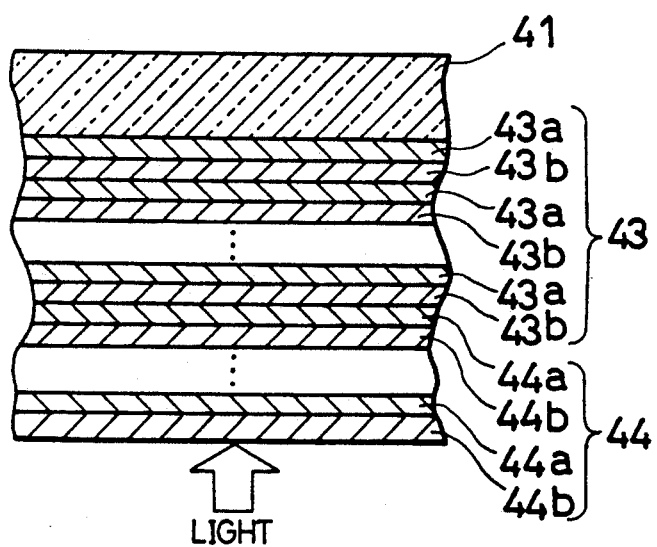
FIG. 15 is a schematic side view of a magneto-optical storage device in accordance with the third embodiment of the present invention.

Referring to FIG. 15, the following description will discuss the third embodiment of the present invention. Here, for convenience of explanation, those of the members having the same functions and described in the second embodiment are indicated by the same reference numerals and the description thereof is omitted.

As illustrated in FIG. 15, a magneto-optical storage device of the present embodiment is mainly constituted by a substrate 41, the first Pt/Co multi-layer film 43 and the second Pt/Co multi-layer film 44, and a light beam is directed thereonto from the second Pt/Co multi-layer film 44 side. The magneto-optical storage device has a configuration wherein the first Pt/Co multi-layer film 43 is formed on the substrate 41, and the second Pt/Co multi-layer film 44 is formed on the first Pt/Co multi-layer film 43.

The first Pt/Co multi-layer film 43 has a configuration wherein Pt layers 43a and Co layers 43b are alternately laminated one after the other to form a laminated section, and the second Pt/Co multi-layer film 44 has a configuration wherein Pt layers 44a and Co layers 44b are alternately laminated one after the other to form another laminated section.

The film thickness ratio of the Pt layer 43a and the Co layer 43b (the film thickness of the Pt layer 43a/that of the Co layer 43b) in the first Pt/Co multi-layer film 43 is set to be greater than the film thickness ratio of the Pt layer 44a and the Co layer 44b (the film thickness of the Pt layer 44a/that of the Co layer 44b) in the second Pt/Co multi-layer film 44.

More specifically, for example, the film thicknesses of the Pt layer 43a and the Co layer 43b are set to 15 Å and 5 Å respectively, and the film thicknesses of the Pt layer 44a and the Co layer 44b are set to 6 Å and 5 Å respectively. Further, the total number of the Pt layers 43a and the Co layers 43b as well as the total number of the Pt layers 44a and the Co layers 44b, is determined to be 20–40.

With this setting of the film thickness ratios, the first Pt/Co multi-layer film 43 adjacent to the substrate 41 exhibits a stabler perpendicular magnetization than the second Pt/Co multi-layer film 44, and the second Pt/Co multi-layer film 44 located farther from the substrate 41 exhibits a greater Kerr effect than the first Pt/Co multi-layer film 43.

As illustrated in FIG. 15, in the above configuration, a larger Kerr rotation angle can be obtained by projecting a light beam thereonto from the side of the second Pt/Co multi-layer film 44 that exhibits the greater Kerr effect. Moreover, since the second Pt/Co multi-layer film 44 is disposed on the first Pt/Co multi-layer film 43 having a stabler perpendicular magnetization, the magnetization of the second Pt/Co multi-layer film 44 becomes more stable when its direction becomes coincident with the direction of an easy axis of the magnetization of the first Pt/Co multi-layer film 43, that is, the vertical direction to the first Pt/Co multi-layer film 43. Therefore, a stable perpendicular magnetization of the second Pt/Co multi-layer film 44 is attained. Thus, this configuration makes it possible to obtain a magneto-optical storage device having a stabler perpendicular magnetization and a larger Kerr rotation angle with respect to a light beam with a short wavelength.

Figure 16:
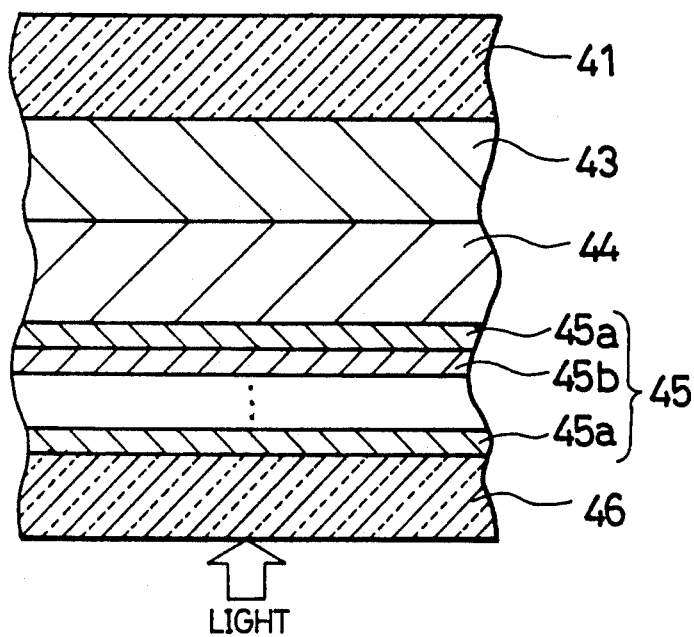
FIG. 16 is a schematic side view of a magneto-optical storage device in accordance with the fourth embodiment of the present invention.

Referring to FIG. 16, the following description will discuss the fourth embodiment of the present invention. Here, for convenience of explanation, those of the members having the same functions and described in the second and third embodiments are indicated by the same reference numerals and the description thereof is omitted.

As illustrated in FIG. 16, a magneto-optical storage device of the present embodiment is mainly constituted by a substrate 41, the first Pt/Co multi-layer film 43 as a first laminated section and the second Pt/Co multi-layer film 44 as a second laminated section, the third Pt/Co multi-layer film 45 as a third laminated section and a transparent film 46, and a light beam is directed thereonto from the transparent film 46 side.

The third Pt/Co multi-layer film 45 is formed on the second Pt/Co multi-layer film 44 that is formed on the first Pt/Co multi-layer film 43 deposited on the substrate 41. The third Pt/Co multi-layer film 45 has a configuration wherein Pt layers 45a and Co layers 45b are alternately laminated one after the other. Further, the transparent film 46, made up of AlN or SiN, is formed on the third Pt/Co multi-layer film 45.

In the magneto-optical storage device of the present embodiment, the third Pt/Co multi-layer film 45 and the transparent film 46 as a protective layer are formed on the second Pt/Co multi-layer film 44, which forms a difference from the device described in the third embodiment.

The film thickness ratio of the Pt layer 45a and the co layer 45b (the film thickness of the Pt layer 45a/that of the Co layer 45b) in the third Pt/Co multi-layer film 45 is set to be greater than the film thickness ratio of the Pt layer 44a and the Co layer 44b (the film thickness of the Pt layer 44a/that of the Co layer 44b) in the second Pt/Co multi-layer film 44. Moreover, the total number of the Pt layers 45a and the Co layers 45b in the third Pt/Co multi-layer film 45 is determined to be smaller than the total number of those layers of the first and second Pt/Co multi-layer films 43 and 44.

More specifically, for example, the film thickness of each of the Pt layers 43a and 45a is set to 15 Å while the film thickness of each of the Co layers 43b and 45b is set to be 5Å. Further, the film thicknesses of the Pt layer 44a and the Co layer 44b are set to 6 Å, and 5 Å respectively. Here, the total number of the Pt layers 43a and the Co layers 43b as well as the total number of the Pt layers 44a and the Co layers 44b, is determined to be 20–40. The total number of the Pt layers 45a and the Co layers 45b is determined to be 4–18.

With this setting of the film thickness ratios, the second Pt/Co multi-layer film 44 comes to exhibit a greater Kerr effect than the first and third Pt/Co multi-layer film 43 and 45, and is sandwiched by the first and third Pt/Co multi-layer films 43 and 45, each having a stabler perpendicular magnetization than that of the second Pt/Co multi-layer film 44.

In the above configuration, a larger Kerr rotation angle can be obtained by projecting a light beam thereonto from the transparent film 46 side. More specifically, the light beam, having transmitted through the transparent film 46, passes through the third Pt/Co multi-layer film 45, which is comparatively thin, and impinges onto the second Pt/Co multi-layer film 44 having a greater Kerr effect; thus, a larger Kerr rotation angle is obtained.

Moreover, since the second Pt/Co multi-layer film 44 is sandwiched by the first and third Pt/Co multi-layer films 43 and 45, each having a stabler perpendicular magnetization than that of the second Pt/Co multi-layer film 44, the magnetization of the second Pt/Co multi-layer film 44 becomes more stable when its direction becomes coincident with the direction of an easy axis of the magnetization of the first and third Pt/Co multi-layer films 43 and 45. Therefore, a stabler perpendicular magnetization of the second Pt/Co multi-layer film 44 is attained.

Thus, this configuration makes it possible to obtain a magneto-optical storage device having a stabler perpendicular magnetization and a larger Kerr rotation angle.

Additionally, one of the features of the present invention lies in that, in a Pt/Co multi-layer film, the film thickness ratio of any pair of adjacent Pt and Co layers located nearer to the side that is opposite the light-impinging side is set to be greater than the film thickness ratio of any other pair of adjacent Pt and Co layers located nearer to the light-impinging side. Therefore, in the second through fourth embodiments, descriptions have been given on those arrangements wherein a light beam is directed thereonto from the side opposite to the substrate 41; yet, the same nature of the magneto-optical storage devices described in the second through fourth embodiment can be attained by the use of arrangements wherein a light beam is directed thereonto from the substrate 41 side. One example of such arrangements of the magneto-optical storage device is given by reversing the locations of the first Pt/Co multi-layer film 43 and the second Pt/Co multi-layer film 44 in the configuration of the third embodiment.

However, when a stable perpendicular magnetization is first maintained by forming on the substrate 41 layers having a great film thickness ratio of Pt layers and Co layers, a further optimal magneto-optical storage device can be obtained.

Referring to FIGS. 17 through 21, the following description will discuss the fifth embodiment of the present invention.

Figure 17:
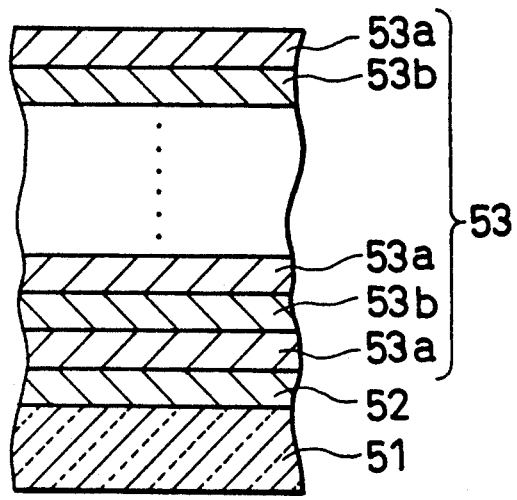
FIG. 17 is a schematic side view of a magneto-optical storage device which is produced by a manufacturing method of magneto-optical storage device in accordance with the fifth embodiment of the present invention.

As illustrated in FIG. 17, a magneto-optical storage device, the manufacturing method of which will be discussed in the present embodiment, is mainly constituted by a substrate 51, an amorphous AlN film (hereinafter, referred to as a-AlN film) 52 and a Pt/Co multi-layer film 53. The a-AlN film 52 is formed on the substrate 51 made of glass or a resin such as polycarbonate, and the Pt/Co multi-layer film 53 is formed on the a-AlN film 52. The Pt/Co multi-layer film 53 has a configuration wherein Pt layers 53a and Co layers 53b are alternately laminated one after the other, and the Pt layers 53a are disposed as the uppermost layer and the lowermost layer thereof.

Figure 18:
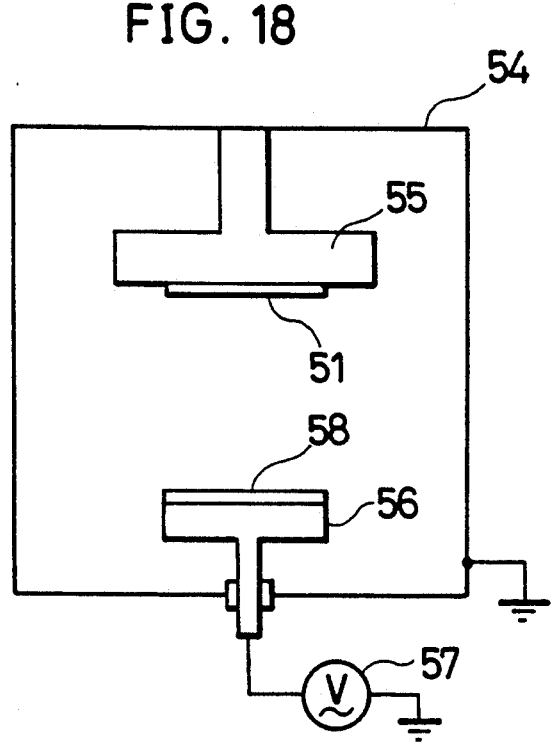
FIG. 18 is a schematic drawing of a sputtering device for forming an amorphous-AlN film to be used in the above-mentioned manufacturing method.

FIG. 18 schematically illustrates a sputtering device for forming the a-AlN film 52 on the substrate 51.

The sputtering device is mainly constituted by a vacuum chamber 54, a substrate holder 55, a cathode 56 and an RF (high frequency) power source 57. The substrate holder 55 holds the substrate 51 and also functions as an anode. An Al target 58 is placed on the cathode 56. The RF power source 57 applies a high-frequency voltage onto the cathode 56.

An explanation will be given as follows on the procedures for forming the a-AlN film 52 on the substrate 51 by the use of this sputtering device.

First, a substrate 51, which has been cleaned, is placed on the substrate holder 55, and an Al target 58 is placed on the cathode 56. Next, the vacuum chamber 54 is fully evacuated. Then, $N_2$ gas and Ar gas are directed into the vacuum chamber 54 at respective predetermined flow rates, and the power is applied from the RF power source 57.

Thus, plasma is produced between the substrate holder 55 and the cathode 56, and reactive sputtering is carried out. That is, accelerated $Ar^+$ ions hit the Al target 58 on the cathode 56, causing Al atoms to come out. These Al atoms react with $N_2$ gas to form a-AlN film 52 on the substrate 51.

Figure 19:
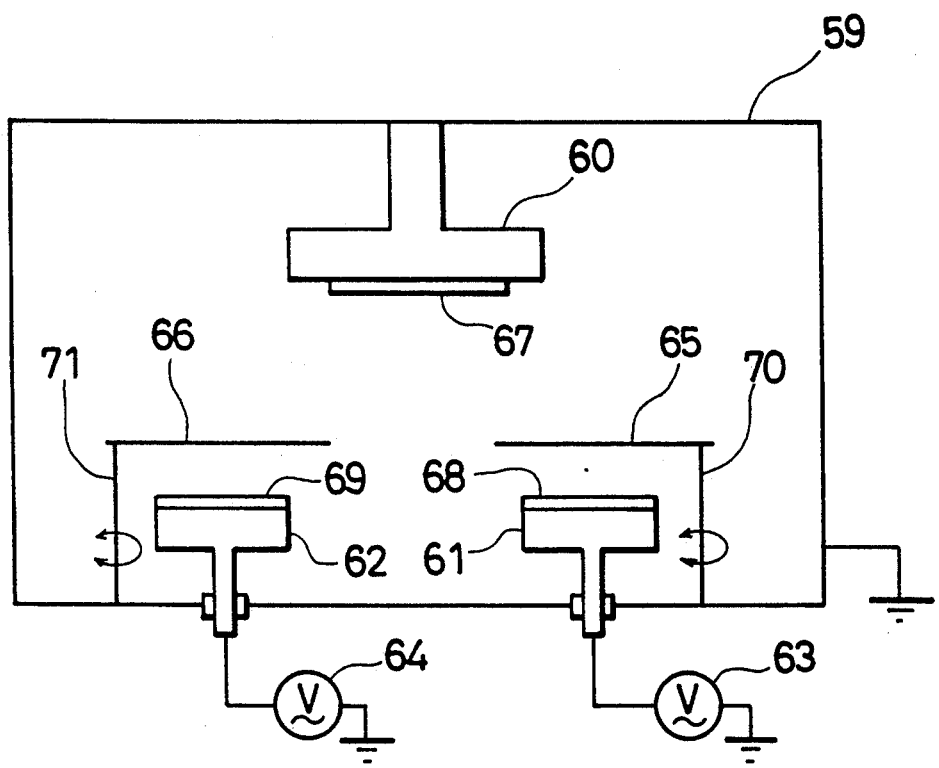
FIG. 19 is a schematic drawing of a dual sputtering device for forming a Pt/Co multi-layer film to be used in the above-mentioned manufacturing method.

Next, FIG. 19 schematically illustrates a dual sputtering device for forming the Pt/Co multi-layer film 53.

The dual sputtering device is mainly constituted by a vacuum chamber 59, a substrate holder 60, cathodes 61 and 62, RF (high frequency) power sources 63 and 64, and shutters 65 and 66. The substrate holder 60 holds an intermediate substrate 67, which is under manufacturing process and has a-AlN film 52 formed on the substrate 51, and also functions as an anode. The cathodes 61 and 62 are target electrodes on which a Pt target 68 and a Co target 69 are respectively placed. The RF power sources 63 and 64 respectively apply a high-frequency voltage onto the cathodes 61 and 62.

The shutters 65 and 66 are respectively installed above the Pt target 68 and the Co target 69, facing the substrate holder 60. These shutters 65 and 66 are respectively secured to rotation shafts 70 and 71 at their respective ends, and are permitted to open and close through the rotations of the rotation shafts 70 and 71. When the shutters 65 and 66 are closed, that is, when the shutters 65 and 66 are placed in front of the Pt target 68 and Co target 69 respectively, Pt atoms and Co atoms coming out of the respective Pt target 68 and Co target 69 are blocked by the shutters 65 and 66, and not permitted to reach the intermediate substrate 67.

An explanation will be given as follows on the procedures for forming the Pt/Co multi-layer film 53 on the a-AlN film 52 that is placed on the intermediate substrate 67 by the use of this dual sputtering device.

First, the intermediate substrate 67 is placed on the substrate holder 60 so that the a-AlN film 52 formed thereon faces the cathodes 61 and 62, while the Pt target 68 and the Co target 69 are respectively placed on the cathodes 61 and 62. Next, the vacuum chamber 59 is fully evacuated. Then, Ar gas is directed into the vacuum chamber 59 at a predetermined flow rate, and the power is applied from the RF power sources 63 and 64 at the same time, with both of the shutters 65 and 66 closed.

Thus, plasma is produced and accelerated $Ar^+$ ions hit the Pt target 68 and the Co target 69, causing Pt atoms and Co atoms to come out of the respective targets. Under this state, by alternately opening and closing the shutters 65 and 66, Pt atoms and Co atoms are alternately permitted to reach the intermediate substrate 67 on the substrate holder 60, and as shown in FIG. 17, the Pt/Co multi-layer film 53 is formed with an alternately laminated configuration of the Pt layers 53a and Co layers 53b.

Magneto-optical storage devices were manufactured by the use of the above sputtering device and dual sputtering device, and the relationship between the forming conditions of the a-AlN film 52 and the coercive force of the resulting multi-layer film 53 was examined.

Glass was employed as the material of the substrate 51, and the a-AlN film 52 was set to 500 Å thick. The film thicknesses of the Pt layer 53a and the Co layer 53b were respectively set to 9.9 Å and 3.0 Å. The total number of the alternately laminated Pt and Co layers 53a and 53b was twelve, and one more Pt layer 53a was deposited thereon as an uppermost layer.

During the forming process of the a-AlN film 52, the $N_2$ gas flow rate was set to a certain value within 2-15 SCCM (standard $cm^3$/min), and the Ar gas flow rate was set to 4 SCCM. The deposition rate of the a-AlN film 52 in this setting was 40 Å/min. On the other hand, during the forming process of the Pt/Co multi-layer film 53, the Ar gas flow rate was set to 6 SCCM. In this setting, the deposition rate of the Pt layer 53a was 0.8 Å/sec, and the deposition rate of the Co layer 53b was 0.1 Å/sec.

Under these conditions, a plurality of the a-AlN film 52 were formed with the $N_2$ gas flow rate varied, and the Pt/Co multi-layer films 53 were formed thereon. Then, the coercive force Hc of each of the Pt/Co multi-layer films 53 was measured, and the ratio (Hc/Hco) of the coercive force Hc and the coercive force Hco, which was obtained in the case of forming the Pt/Co multi-layer film 53 directly on the glass substrate 51, was found. Here, Hco was 98 Oe in the present embodiment.

Figure 20:
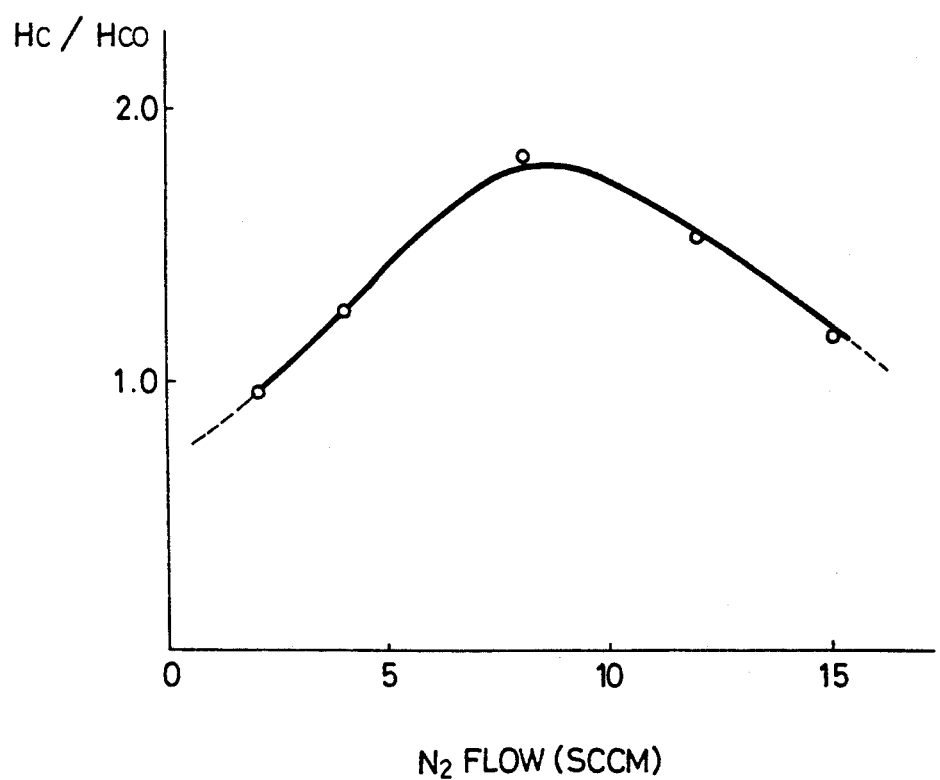
FIG. 20 is a graph illustrating the relationship between the coercive force of the Pt/Co multi-layer film and the $N_2$ gas flow rate during the forming process of the amorphous-AlN film.

A curve in FIG. 20 illustrates the relationship between the ratio Hc/Hco and the $N_2$ gas flow rate. In this drawing, the vertical axis represents Hc/Hco, and the horizontal axis represents the $N_2$ gas flow rate.

It is found from FIG. 20 that the coercive force Hc of the Pt/Co multi-layer film 53 is deeply dependent on the $N_2$ gas flow rate during the forming process of the a-AlN film 52, and marks a maximum value when the $N_2$ gas flow rate is set to an appropriate value (substantially 8 SCCM in the present embodiment).

Next, the crystalline structure of the Pt/co multi-layer film 53 of the magneto-optical storage device was examined by means of X-ray diffraction.

Figure 21:
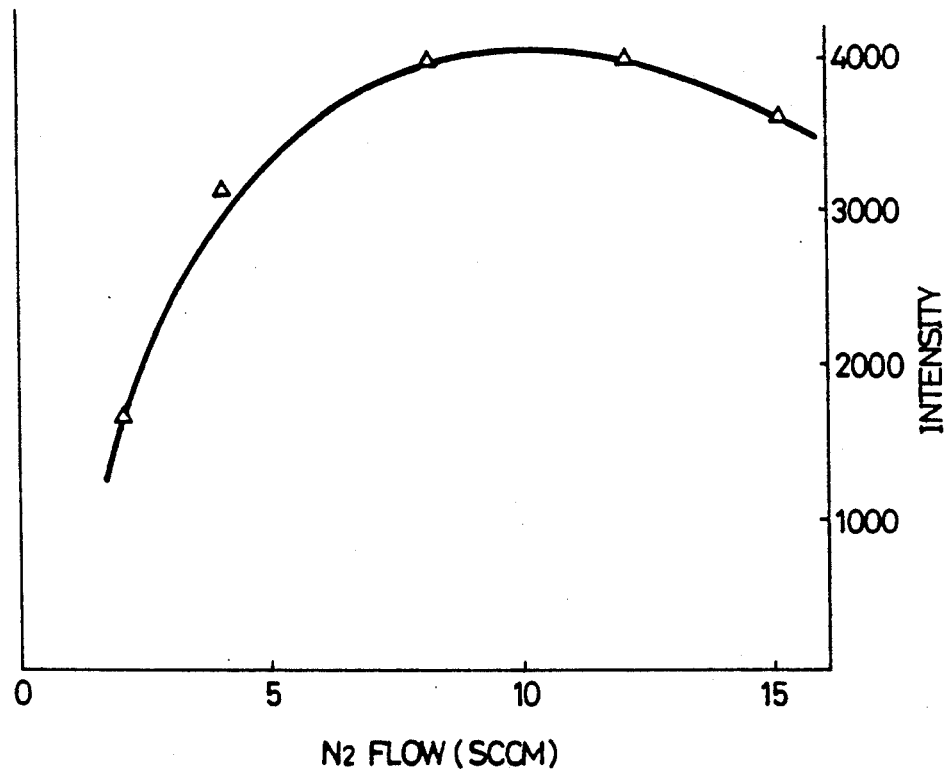
FIG. 21 is a graph illustrating the relationship between the intensity of a diffracted X-ray from a (111) face of the Pt/Co multi-layer film and the $N_2$ gas flow rate during the forming process of the amorphous-AlN film.

As a result, it is found that the Pt/Co multi-layer film 53 is a polycrystalline substance and has a fcc (face-centered cubic) structure. It is also found that the (111) face of the fcc grating is oriented in parallel with the substrate 51. A graph in FIG. 21 illustrates the intensity of an X-ray diffracted by the (111) face of the Pt/Co multi-layer film 53. In this drawing, the vertical axis represents the intensity of the diffracted X-ray by the (111) face of the Pt/Co multi-layer film 53, and the horizontal axis represents the $N_2$ gas flow rate. Here, the unit of the intensity is CPS (count/sec). Additionally, the intensity was 1000 CPS where the Pt/Co multi-layer film 53 was formed directly on the glass substrate 51.

As shown in FIG. 21, as with the above-mentioned coercive force Hc, the intensity of the diffracted X-ray by the (111) face is deeply dependent on the $N_2$ gas flow rate during the forming process of the a-AlN film 52, and marks a maximum value when the $N_2$ gas flow rate is set to an appropriate value. At this time, the perfectness of the crystallinity of the Pt/Co multi-layer film 53 is best attained.

When comparison is made between the results from FIG. 20 and those from FIG. 21, an $N_2$ gas flow rate that permits the intensity of the diffracted X-ray by the (111) face to become maximum is substantially coincident with the $N_2$ gas flow rate that permits the coercive force Hc to become maximum. Therefore, it is considered that when the perfectness of the crystallinity of the Pt/Co multi-layer film 53 is improved, the coercive force Hc becomes greater.

As described above, by setting an appropriate $N_2$ gas flow rate during the forming process of the a-AlN film 52, the coercive force Hc can be increased. This obviates the necessity of increasing the Ar gas pressure during the forming process of the Pt/Co multi-layer film 53 with a view to increasing the coercive force Hc. Thus, the Pt/Co multi-layer film 53 with a minimum of pores can be formed by the use of a low Ar gas pressure. Further, since the Pt/Co multi-layer film 53 is formed on an a-AlN film 52, the large crystal grains of the Pt/Co multi-layer film is avoidable, different from the case where a Pt/Co multi-layer film is formed on a metal having a fcc structure.

As described above, in accordance with the manufacturing method of the magneto-optical storage device of the present embodiment, a Pt/Co multi-layer film 53 with a minimum of pores, whose crystal grain size is small, can be obtained. Therefore, by employing this Pt/Co multi-layer film 53, a magneto-optical storage device wherein a low noise level is achieved during information reproduction can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical storage device comprising:
   a substrate;
   a first AlN film;
   a second AlN film;
   a Pt/Co multi-layer film formed by alternately laminating Pt and Co one after the other; and
   an Al reflective film,
   the first AlN film, the Pt/Co multi-layer film, the second AlN film and the Al reflective film being successively formed on the substrate,
   wherein a film thickness $\delta AlN$ (1) of the first AlN film is set to range within 50 rim s $\delta AlN$ (1)$\leq$200 nm;
   a film thickness $\delta AlN$ (2) of the second AlN film is set to range within 120 nm$\leq \delta AlN$ (2)$\leq$140 nm;
   a film thickness $\delta Pt$ of a single Pt layer of the Pt/Co multi-layer film is set to range within 0.6 nm$\leq \delta Pt$ $\leq$1.0 nm;
   a film thickness $\delta Co$ of a single Co layer of the Pt/Co multi-layer film is set to range within 0.3 nm $\delta Co \leq$0.6 nm; and
   a total film thickness $\delta Pt/Co$ of the Pt/co multi-layer film is set to range within 15 nm$\leq \delta Pt/Co \leq$20 nm.

2. A magneto-optical storage device comprising:
   a substrate;
   a first AlN film;
   a second AlN film;
   a Pt/Co multi-layer film formed by alternately laminating Pt and Co one after the other; and
   an Al reflective film,
   the first AlN film, the Pt/Co multi-layer film, the second AlN film and the Al reflective film being successively formed on the substrate,
   wherein a film thickness $\delta AlN$ (1) of the first AlN film is set to range within 50 nm$\leq \delta AlN$ (1)$\leq$200 nm;
   a film thickness $\delta AlN$ (2) of the second AlN film is set to range within 120 nm$\leq \delta AlN$ (2)$\leq$140 nm;
   a film thickness $\delta Pt$ of a single Pt layer of the Pt/Co multi-layer film is set to range within 0.7 nm$\leq \delta Pt$ $\leq$0.8 nm;
   a film thickness $\delta Co$ of a single Co layer of the Pt/Co multi-layer film is set to range within 0.4 nm $\delta Co \leq$0.5 nm; and
   a total film thickness $\delta Pt/Co$ of the Pt/Co multi-layer film is set to range within 15 nm$\leq \delta Pt/Co \leq$20 nm.

3. A magneto-optical storage device comprising:
   a substrate; and
   a Pt/Co multi-layer film,
   the Pt/Co multi-layer film being formed on the substrate by alternately laminating Pt layers and Co layers one after the other,
   wherein a film thickness ratio of any pair of adjacent Pt and Co layers located nearer to a side that is opposite a light-impinging side is set to be greater than a film thickness ratio of any other pair of adjacent Pt and Co layers located nearer to the light-impinging side.

4. A magneto-optical storage device as set forth in claim 3, wherein a light beam is directed thereonto from the substrate side, and a film thickness ratio of any pair of adjacent Pt and Co layers located farther from the substrate is set to be greater than a film thickness ratio of any other pair of adjacent Pt and Co layers located nearer to the substrate.

5. A magneto-optical storage device as set forth in claim 3, wherein a light beam is directed thereonto from a side opposite the substrate side, and a film thickness ratio of any pair of adjacent Pt and Co layers located nearer to the substrate is set to be greater than a film thickness ratio of any other pair of adjacent Pt and Co layers located farther from the substrate.

6. A magneto-optical storage device as set forth in claim 3, wherein the Pt/Co multi-layer film includes a plurality of Pt/Co laminated sections, each constituted by alternately laminating Pt layers and Co layers one after the other, any pair of the adjacent Pt and Co layers in each Pt/Co laminated section having a constant film thickness ratio, each Pt/Co laminated section having a different film thickness ratio from the others.

7. A magneto-optical storage device comprising:
   a substrate; and
   a multilayer film,
   the multilayer film including first, second, and third Pt/Co laminated sections, each constituted by alternately laminating pt layers and Co layers one after the other, said first, second, and third laminated sections being successively formed above the substrate so that a light beam is directed onto the device from the third Pt/Co laminated section side,
   wherein any pair of the adjacent Pt and Co layers in each Pt/Co laminated section has an identicial film thickness ratio, and film thickness ratios of the first and third Pt/Co laminated sections are greater than the film thickness ratio of the second Pt/Co laminated section while a film thickness of the third Pt/Co laminated sections is thinner than a film thickness of the second Pt/Co laminated section.

8. A manufacturing method of the magneto-optical storage device comprising a first and second steps:
   the first step forming an amorphous AlN film on the substrate by sputtering an Al target is a flow of a mixed gas of $N_2$ and Ar; and the second step forming a Pt/Co multi-layer film by alternately laminating Pt and Co layers on the AlN film by alternately sputting Pt targets and Co targets in a flow of Ar gas.

the first step further including an operation for setting a $N_2$ gas flow rate based on a correlation between the $N_2$ gas flow rate and a coercive force of the Pt/Co multi-layer film in order to obtain a Pt/Co multi-layer film with a high coercive force.

9. A manufacturing method of the magneto-optical storage device comprising a first and second steps:

the first step forming an amorphous AlN film on the substrate by sputtering an Al target in a flow of a mixed gas of $N_2$ and Ar; and the second step forming a Pt/Co multi-layer film by alternately laminating Pt and Co layers on the AlN film by alternately sputtering Pt targets and Co targets in a flow of Ar gas.

the first step further including an operation for setting a $N_2$ gas flow rate so as to make maximum the intensity of a diffracted X-ray by a (111) plane of the fcc (face-centered cubic) Pt/Co multi-layer film structure.

* * * * *